US011482855B2

(12) United States Patent
Manditereza et al.

(10) Patent No.: US 11,482,855 B2
(45) Date of Patent: Oct. 25, 2022

(54) ELECTRICAL PROTECTION SYSTEM FOR DETECTION AND ISOLATION OF FAULTS IN POWER DISTRIBUTION USING SYNCHRONIZED VOLTAGE MEASUREMENTS AND A METHOD OF ITS APPLICATION

(71) Applicant: UNIVERSITY OF PRETORIA, Pretoria (ZA)

(72) Inventors: Patrick Tendayi Manditereza, Bloemfontein (ZA); Ramesh Chand Bansal, Uttarakhad (ZA)

(73) Assignee: UNIVERSITY OF PRETORIA, Pretoria (ZA)

( * ) Notice: Subject to any disclaimer, the term of this patent is extended or adjusted under 35 U.S.C. 154(b) by 0 days.

(21) Appl. No.: 17/242,983

(22) Filed: Apr. 28, 2021

(65) Prior Publication Data
US 2021/0249853 A1 Aug. 12, 2021

Related U.S. Application Data

(63) Continuation of application No. PCT/ZA2019/050072, filed on Nov. 12, 2019.

(30) Foreign Application Priority Data

Nov. 21, 2018 (ZA) .................................. 2018/07844

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC .......... H02H 1/0007; H02H 3/28; H02H 3/30; H02H 7/22; H02H 7/263
See application file for complete search history.

(56) References Cited

U.S. PATENT DOCUMENTS

2006/0224336 A1* 10/2006 Petras ..................... H04L 12/66
702/62
2016/0274169 A1* 9/2016 Cui .......................... H02H 7/28

FOREIGN PATENT DOCUMENTS

EP 1 780 858 A1 5/2007
EP 1780858 A1 * 5/2007 ............... H02H 3/28
(Continued)

OTHER PUBLICATIONS

International Search Report of International Searching Authority issued by the European Patent Office for corresponding International Patent Application PCT/ZA2019/050072, dated Mar. 16, 2020.

*Primary Examiner* — Jared Fureman
*Assistant Examiner* — Nicolas Bellido
(74) *Attorney, Agent, or Firm* — Myers Wolin, LLC

(57) ABSTRACT

An electrical protection system arranged to detect and isolate faults either in a electrical power distribution. The system comprises at least a first busbar and a second busbar in electrical communication with each other through s powerline having a first end electrically coupled to the first busbar by a first circuit breaker and a second end connected to the second busbar by a second circuit breaker. It is connected to the at least two busbars, and configured to simultaneously collect/determine a first electrical quantity at each of the at least two busbars and compare the collected/ determined electrical quantity to a second. When the first electrical quantity value less than the second quantity value, the system causes the first and second circuit breakers to open so as to decouple the electrical connection between (Continued)

first and second busbars. The system 100 detects and isolates fault efficiently while using voltage measurements.

32 Claims, 8 Drawing Sheets

(56) References Cited

FOREIGN PATENT DOCUMENTS

| WO | WO-2007051322 A1 * | 5/2007 | ............... H02H 3/28 |
| WO | 2017/125145 A1 | 7/2017 | |

* cited by examiner

ELECTRICAL PROTECTION SYSTEM FOR DETECTION AND ISOLATION OF FAULTS IN POWER DISTRIBUTION USING SYNCHRONIZED VOLTAGE MEASUREMENTS AND A METHOD OF ITS APPLICATION

CROSS REFERENCE TO RELATED APPLICATIONS

This application is a continuation of International Application No. PCT/ZA2019/050072, filed on Nov. 12, 2019, which takes priority from South African Patent Application No. 2018/07844, filed on Nov. 21, 2018, the contents of each of which are incorporated by reference herein.

FIELD OF THE INVENTION

This disclosure relates generally to detection and clearance of faults in an electrical system, in particular the invention relates to an electrical protection system and a method of detecting fault.

BACKGROUND

The Inventors' appreciate that there are existing protection systems which are currently available and widely used in the market. In particular, conventional protection systems work on a philosophy that assumes radial or one-way flow of current from a single source. This philosophy falls away when distributed generations (DGs) are integrated which transforms a traditional distribution system into a multi-source system. The Inventors' are of the view that this shortcoming results in unpredictable behaviors of the existing protection system leading to possible loss of coordination. As it is understood in the context of the present specification, coordination is the systematic selection and application of protective devices in an electrical power system, such that, in response to a fault, the sequence of the protection devices is such that only those relevant to the faulty zone complete the tripping function thereby removing only a minimum amount of equipment or circuit from service. Loss of coordination therefore means that a protection device that is not relevant to a faulty zone trips (instead of the relevant device) resulting in unnecessary loss of supply to a wider section of the network.

Additionally, DGs have variable outputs that depend on operating conditions of an electrical network and this has the effect of producing variable fault currents, further compromising the protection coordination of an existing protection system. The loss of protection coordination significantly impacts the reliability of the distribution system. The Inventors' are further of the view that the current protection systems are disadvantageous in that, they require that the integrated DGs contribute fault current in order to facilitate detection of the fault. However, some of the DGs do not have the capability to supply fault current which makes detection and identification of fault a challenging exercise, in use.

Another drawback of the current protection systems, as identified by the Inventors, is that the current protection systems tend to fail under an islanded mode of operation. An islanded mode of operation is where the DGs continue to power an area even though an electrical grid power is no longer present. This is because the current protection systems require the supply of appreciable levels of fault current by the DGs in order to facilitate fault detection, however, in an islanded mode of operation, this current may not be available.

Other existing protection systems use only voltage measurement for their function and are the so-called under-voltage and over-voltage relay. These simply detect under or over voltage condition resulting from fault or other causes, however, they are unable to identify nor locate a position at which the fault appears.

It is an object of the present invention to provide an improved electrical protection system and a method of detecting fault, which will, in the Inventors' view, alleviate some of the above-mentioned drawbacks.

SUMMARY

According to a first aspect of the invention, there is provided an electrical protection system which is arranged to detect and isolate faults either selectively or non-selectively in a power system/electrical power distribution comprising at least a first busbar and a second busbar in electrical communication with each other by means of at least one powerline (i.e. feeder) having a first end that is electrically coupled to the first busbar by a first circuit breaker and a second end that is connected to the second busbar by a second circuit breaker, the protection system being connected to the at least two busbars, and configured to simultaneously collect/determine a first electrical quantity (such as voltage phasor values and fault signature values) at each of the at least two busbars and compare the collected/determined electrical quantity to a second, reference electrical quantity value, (such as reference voltage phasor values and reference fault signature values), and wherein when the first electrical quantity value is more or less than the second reference electrical quantity value, the protection system causes at least one of the first and second circuit breakers to open so as to decouple the electrical connection between at least the first and second busbars.

In an embodiment, the electrical protection system comprises:
 a communication network;
 at least a first relay and a second relay which are communicatively coupled to each other through the communication network, the first relay being connected to at least one of the first busbar and at least one powerline (i.e. feeder) so as to define a protection zone over the first busbar, first circuit breaker and at least one powerline, and wherein the second relay being connected to at least one of the second busbar and at least one powerline so as to define a second protection zone over the second busbar, second circuit breaker and at least one powerline;
 a first electrical quantity measuring means coupled to the first relay for measuring a first electrical quantity value (such as voltage phasor values) at one of the first busbar and at least one powerline;
 a second electrical quantity measuring means coupled to the second relay for measuring a first electrical quantity value (such as voltage phasor values) at one of the second busbar and at least one powerline, at the same time as the first electrical quantity measuring means measures the first electrical quantity value at the first busbar;
 a comparison module being operable to compare the first electrical quantity value collected/measured by each of the first electrical quantity measuring means and second electrical quantity means to a second reference electrical quantity value (i.e. stored historical data voltage phasor values indicative of prefault conditions of the power system) at the dedicated busbar;

a calculation module being operable to calculate fault signature values at the first busbar and second busbar when the first electrical quantity value is different from the second electrical quantity value;

the comparison module further being operable to determine whether or not the calculated fault signature values match with pre-defined threshold fault signatures;

wherein, when the calculated signature values collected by the first relay are more or less than the predefined threshold fault signature, the first relay transmits a trip request signal/message to the second relay; and upon receiving the trip request signal, the second relay confirms whether or not the calculated signature values at the second busbar are more or less than the pre-defined threshold signature value at the second busbar, and accordingly transmits a confirmation or deny signal to the first relay to either open the first circuit breaker or keep the first circuit breaker closed.

In an embodiment, when a confirmation or deny trip request signal is not received after a lapse of a predefined period, the first relay automatically opens the first circuit breaker at the at least one power line.

In an embodiment, when the second relay transmits a confirmation message to the first relay, the second relay opens the second circuit breaker communicating the powerline with the first busbar.

In an embodiment, the first protection zone and second protection zone may overlap.

In an embodiment, the first electrical quantity value may include voltage phasor values which may include voltage magnitude and phase values.

Preferably, the system may include a plurality of busbars and a network of powerlines terminating one of the busbars.

The measuring means may, preferably, be in a form of phasor measurement device, for example, a voltage phasor measurement device. The voltage phasor measurement device may form an integral part of the relay. Alternatively, the voltage phasor measurement device may be a separate device connectively coupled to the relay.

The communication network may be, for example, a wired connection between the at least two relays. In addition, the communication network may be a communication link which may include a communication protocol suitable for transmitting voltage magnitude and phase values between the at least two first and second relays.

In a preferred embodiment, the protection system may include at a voltage transformer, preferably, at least two voltage transformers being operable to step down primary voltage suitable levels that may be fed to an electronic device, in use.

The calculation module may calculate the fault signatures using, for example, load flow and sensitivity calculations at the busbars.

The pre-defined threshold may be established by magnitude of fault signatures generated when a maximum load at the busbar is connected, in use.

Each of the at least two first and second relays may include a storage module, whereby reference voltage magnitude and phase values are stored thereon. The storage module may be updated, on, for example, regular basis with the historic values of the voltage magnitude and phase representing pre-fault status of the power system on at least the first and second busbars.

Fault may be short-circuit faults. Alternatively, faults may be open-circuit faults.

According to another aspect of the invention there is provided an electrical system comprising:

a power system for connecting to an electrical grid or power source, the power system comprising at least a first busbar and a second busbar in electrical communication with each other by means of at least one power line (i.e. feeder) having a first end that is electrically coupled to the first busbar by a first circuit breaker and a second end that is electrically connected to the second busbar by a second circuit breaker; and an electrical protection system which is arranged to detect and isolate faults either selectively or non-selectively in the power system, the protection system being connected to the at least two busbars, and configured to simultaneously collect/determine a first electrical quantity value (such as voltage phasor values and fault signature values) at each of the at least two busbars and compare the collected/determined electrical quantity value to a second, reference electrical quantity value (such as reference voltage phasor values and reference fault signature values), and wherein when the first electrical quantity value is more or less than the second reference electrical quantity value, the protection system causes at least one of the first and second circuit breakers to open so as to decouple the electrical connection between at least the first and second busbars.

In an embodiment, the protection system comprises:

a communication network;

at least a first relay and a second relay which are communicatively coupled to each other through the communication network, the first relay being connected to at least one of the first busbar and at least one powerline (i.e. feeder) so as to define a protection zone over the first busbar, first circuit breaker and at least one powerline, and wherein the second relay being connected to at least one of the second busbar and at least one powerline so as to define a second protection zone over the second busbar, second circuit breaker and at least one powerline;

a first electrical quantity measuring means coupled to the first relay for measuring a first electrical quantity value (such as voltage phasor values) at one of the first busbar and at least one powerline;

a second electrical quantity measuring means coupled to the second relay for measuring a first electrical quantity value (such as voltage phasor values) at one of the second busbar and at least one powerline, at the same time as the first electrical quantity measuring means measures the first electrical quantity value at one of the first busbar and at least one feeder;

a comparison module being operable to compare the first electrical quantity value that is simultaneously collected/measured by each of the first electrical quantity measuring means and second electrical quantity means, to a second reference electrical quantity value (i.e. stored historical data voltage phasor values indicative of pre-fault status of the power system) at the dedicated busbar;

a calculation module for calculating fault signature values at the first busbar and second busbar when the first electrical quantity value is different from the second electrical quantity value;

the comparison module further being operable to determine whether or not the calculated fault signature values match with pre-defined threshold fault signatures;

wherein, when the calculated signature values collected by the first relay are more or less than the predefined threshold fault signature, the first relay transmits a trip request signal/message to the second relay; and upon receiving the trip request signal, the second relay confirms whether or not the calculated signature values at the second busbar are more or less than the predefined threshold signature value at the second busbar, and accordingly transmits a confirmation or deny signal to the first relay to either open the first circuit breaker or keep the first circuit breaker closed.

In an embodiment, when a confirmation or deny trip request signal is not received after a lapse of a predefined period, the first relay automatically opens the first circuit breaker at the at least one power line.

In an embodiment, when the second relay transmits a confirmation message to the first relay, the second relay opens the second circuit breaker communicating the powerline with the first busbar.

In an embodiment, the first protection zone and second protection zone may overlap.

In an embodiment, the first electrical quantity value may include voltage phasor values which may include voltage magnitude and phase values.

Preferably, the system may include a plurality of busbars and a network of powerlines terminating one of the busbars.

The measuring means may, preferably, be in a form of phasor measurement device, for example, a voltage phasor measurement device. The voltage phasor measurement device may form an integral part of the relay. Alternatively, the voltage phasor measurement device may be a separate device connectively coupled to the relay.

The communication network may be, for example, a wired connection between the at least two relays. In addition, the communication network may be a communication link which may include a communication protocol suitable for transmitting voltage magnitude and phase values between the at least two first and second relays.

In a preferred embodiment, the protection system may include at a voltage transformer, preferably, at least two voltage transformers being operable to step down primary voltage suitable levels that may be fed to an electronic device, in use.

The calculation module may calculate the fault signatures using, for example, load flow and sensitivity calculations at the busbars.

The pre-defined threshold may be established by magnitude of fault signatures generated when a maximum load at the busbar is connected, in use.

Each of the at least two first and second relays may include a storage module, whereby reference voltage magnitude and phase values are stored thereon. The storage module may be updated, on, for example, regular basis with the historic values of the voltage magnitude and phase representing pre-fault status of the power system on at least the first and second busbars.

Fault may be short-circuit faults. Alternatively, faults may be open-circuit faults.

According to yet another aspect of the invention, there is provided a method for detecting and isolating fault in a power system comprising at least a first busbar and a second busbar in electrical communication with each other by means of at least one power line (i.e. feeder) having a first end that is electrically coupled to the first busbar by a first circuit breaker and a second end that is connected to the second busbar by a second circuit breaker, the method includes the steps of:

connecting a protection system to the at least two first and second busbars;

simultaneously collecting/determining, by the protection system, a first electrical quantity value (such as voltage phasor values and fault signature values) at each of the at least two first and second busbars;

comparing, by the protection system, the collected/determined first electrical quantity value to a second, reference electrical quantity value (such as reference voltage phasor values and reference fault signature values), and wherein when the first electrical quantity value is more or less than the second reference electrical quantity value, the protection system causing at least one of the first and second circuit breakers to open so as to decouple the electrical connection between at least the first and second busbars.

BRIEF DESCRIPTION OF THE DRAWINGS

The objects and features of the present invention will become fully apparent from following the description taken in conjunction with the accompanying drawings. Undertaking that these drawings depict only typical embodiments of the invention and are therefore, not to be considered limiting its scope, the invention will be described and explained with additional specific detail through the use of the accompanying drawings in which.

DETAILED DESCRIPTION OF THE PREFERRED EMBODIMENTS

While various inventive aspects, concepts and features of the invention may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present invention. Still further, while various alternative embodiments as to the various aspects, concepts and features of the invention —such alternative structures, configurations, methods, circuits, devices and components, software, hardware, control logic, alternatives as to form, fit and function, and so on may be described herein, such descriptions are not intended to be a complete or exhaustive list of available alternative embodiments, whether presently known or later developed.

Those skilled in the art may readily adopt one or more of the inventive aspects, concepts of features into additional embodiments and uses within the scope of the present invention even if such embodiments are not expressly disclosed herein. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive but rather there may be inventive aspects, concepts and features that are fully described herein without being expressly identified as such or as part of a specific invention.

Figure 1:
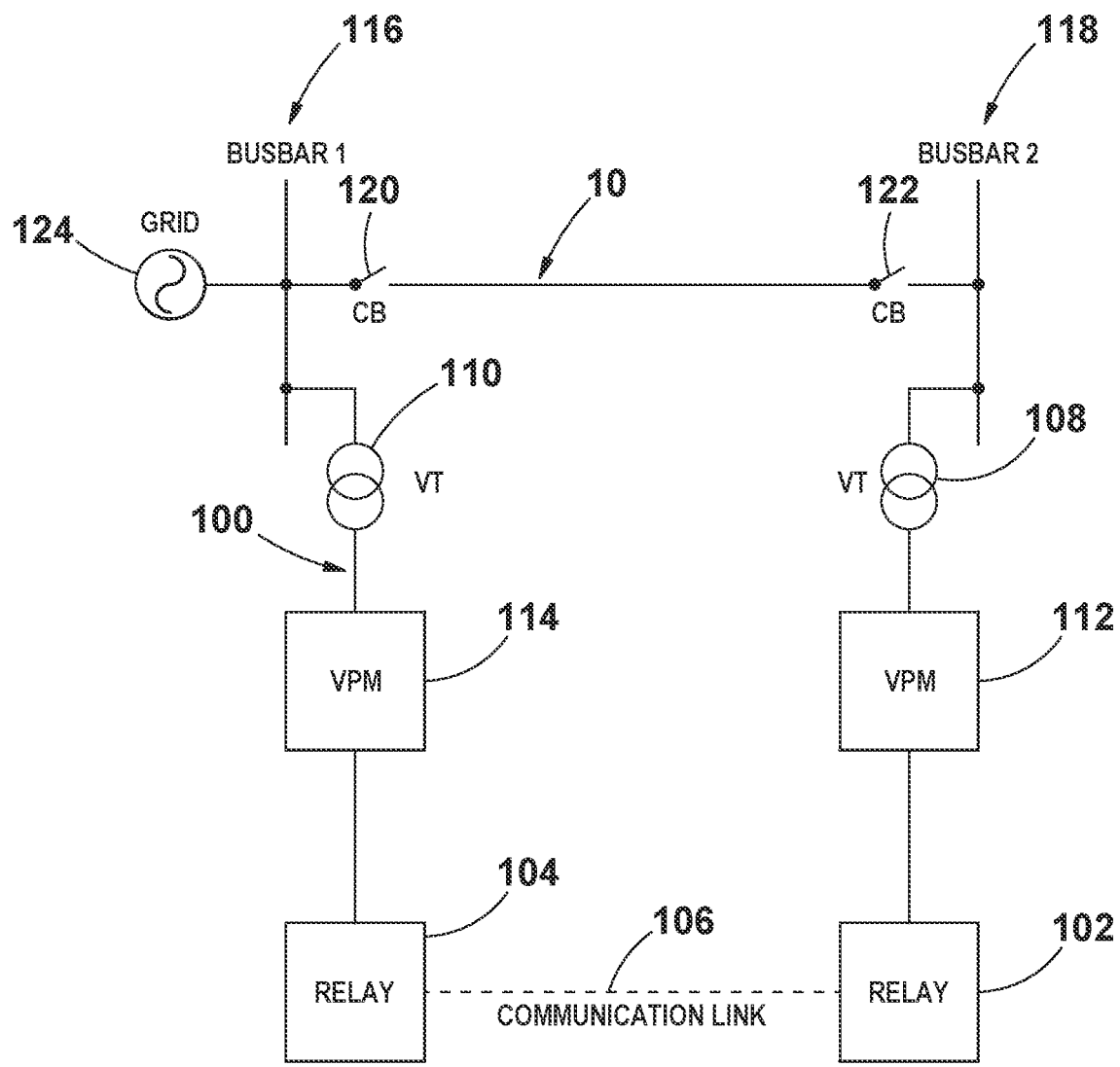
FIG. 1 shows a simplified view of an electrical network including a protection system, in accordance with the invention.

Referring to FIG. 1, reference numeral 10 generally indicates a simplified electrical network or power system. The simplified electrical network 10 includes a protection system 100 in accordance with the invention. The protection system 100 is capable of detecting and identifying a location of a fault in the electrical network 10 irrespective of a type of a distribution system, that is, whether it is a single or multi-source, and either selectively or non-selectively isolating the fault.

FIG. 1 indicates at least two controllers, i.e. relays, preferably, protection relays indicated with reference numerals 102, 104 respectively. In an example embodiment, the protection relays are DDFDIA type of relays. Those who are skilled in the art of the present invention will know that DDFDIA stands for Distributed Differential Fault Detection and Identification Algorithm, in which protection is structured beginning with the zoning arrangements that are distributed and the fault detection algorithm that is differential in principle. Each of these protection relays 102, 104 are communicatively connected/coupled to each other through a communication network, e.g., a communication link 106. The communication link 106 enables the relays 102, 104 to share information e.g. voltage phasor measurement values, amongst each other, in use.

The communication link 106 can be, for example, a hardwired connection between the at least two protection relays 102, 104. In addition, the communication link 106 can include a communication protocol suitable for transmitting an electrical quantity value, such as voltage magnitude and phase values, between the at least two protection relays 102, 104. In particular, the communication link allows the protection relays 102, 104 to share information about the voltage magnitude and phase measurements, amongst each other. In use, each protection relay 102, 104 requires knowledge of the magnitude and phase angle of the voltages at its dedicated busbars 116, 118 of the power system 10. It will appreciated by those skilled in the art that the communication link 106 can be any physical connection and communication protocol suitable for transmission of, for example, voltage magnitude and phase measurements, sampled values and protection commands can be used for the communication link 106.

The power system 10 includes a first busbar indicated as reference number 116, and a second busbar indicated as reference number 118. FIG. 1 further illustrates two circuit breakers indicated with reference numerals 120, 122, respectively, and a power grid 124.

The power system 10 further includes at least two voltage transformers indicated with reference numeral 108, 110 respectively. In use, each of these voltage transformers 108, 110 steps down primary voltage to levels that can be fed to various electronic devices that can be used by an end user (i.e. consumers). The voltage transformers 108, 110 can be of a conventional or non-conventional type. By way of example, the conventional type voltage transformer can be an electromagnetic voltage transformer (usually abbreviated VT) that is wire-wound and uses electromagnetic theory to step down the voltage. The conventional type voltage transformer can also be a capacitor voltage transformer (CVT) that uses a capacitance potential divider and can have a small electromagnetic transformer at the last stage. On the other hand, the non-conventional VTs include the optical voltage transformer that exploits the electrical properties of optical media. The optical VT is based on optical sensing principles. There may be of course other methods used in stepping down voltage which may be equally used in the present invention. Therefore, the methods of stepping down voltage which are mentioned herein are merely exemplary and should not be construed as limiting the scope of the present invention.

The protection system 100 further includes at least two measuring means for measuring an electrical quantity value from the first and second busbars 116, 118, respectively. The measuring means can be phasor measurement units (PMUs), preferably, voltage phasor measurement devices 112, 114. Those who are skilled in the art will understand that a PMU provides voltage and current phasors and other variables as well such as frequency and the rate of change of frequency.

However, the device required for the implementation of the present invention needs only to provide voltage phasors, hence the choice of the use of a VPMU (i.e. voltage phasor measurement unit). In an example embodiment, the voltage phasor measurement devices 112, 114, can form an integral part of the protection relays 102, 104 respectively. Alternatively, each of the voltage phasor measurement devices 112, 114 can be separate from the protection relays 102, 104 and communicatively coupled to the protection relays 102, 104 through a suitable manner. In use, each voltage phasor measurement device 112, 114 extracts/collects the magnitude and phase angle (with respect to some reference quantity) of the voltage at a particular busbar 116, 118. The two voltage phasor measurement devices 112, 114 are synchronized with the aid of a common synchronization signal or clock (the reference quantity) provided by a satellite-based system such as the Global Positioning System (GPS). The voltage phasor measurement devices 112, 114 are referred to as PMUs as described above, and the obtained measurements are known as synchro phasors. Alternatively, the voltage phasor measurement devices 112, 114 can use multiple time sources including non-GPS references as long as they are all calibrated and working synchronously.

Figure 2:
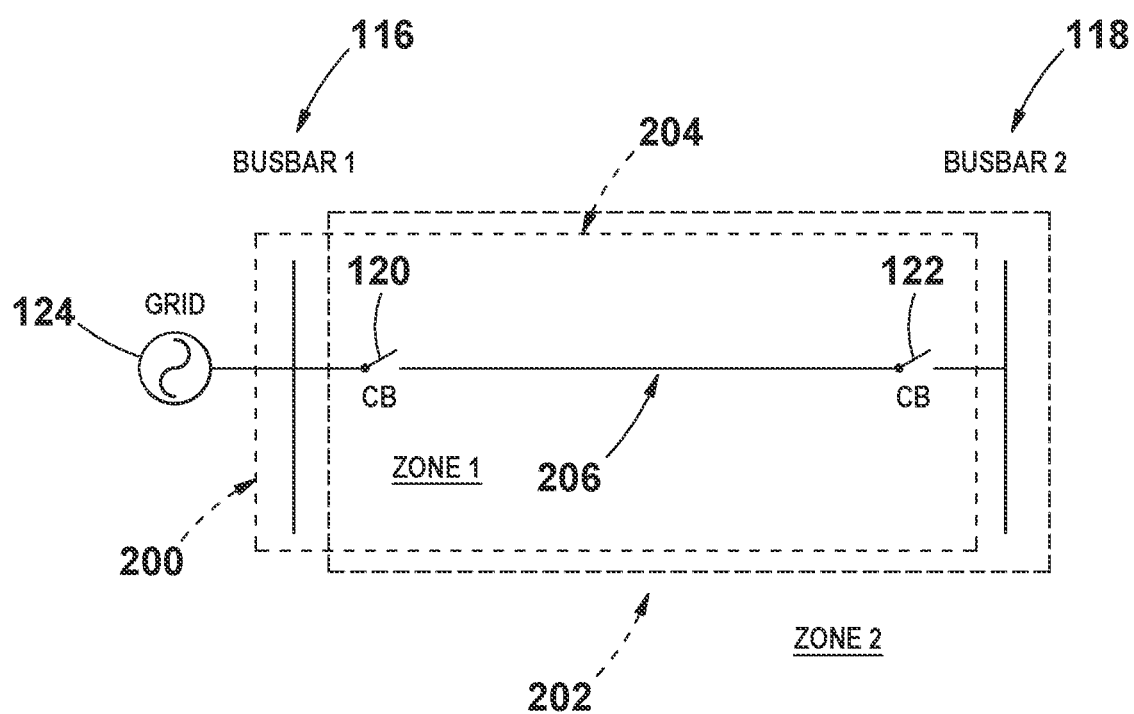
FIG. 2 shows an example embodiment of protection zones which form part of the system of FIG. 1.

Referring now to FIG. 2 which illustrates an example of overlapping protection zones 200. Each of the protection relays 102, 104 is positioned so as to fall within at least one of the two protection zones of the overlapping protection zones 200. The protection zones are indicated with reference numerals 202, 204 respectively. Therefore, in an example embodiment, protection zone 202 would include busbar 118, protection relay 102 (not shown in FIG. 2) and a feeder 206 terminating at busbar 118. In addition, protection zone 204 includes busbar 116, protection relay 104 (not shown in FIG. 2), and the feeder 206 terminating at busbar 116. The protection zones 202, 204 typically overlap with each other around the feeder 206. Voltage measurements are made available to the protection relays 102, 104 by VPMUs 112, 114 (not shown in FIG. 2), to enable the protection relays 102, 104 to establish protection zones 202, 204 over which they provide protection over the first busbar 116, second busbar 118 and feeder 206. Each protection relay 102, 104 is arranged to compare the instantaneous power flowing into and out of its dedicated protection zone 202, 204 respectively. In order for this to be achieved, the voltages at the busbars 116, 118 that are surrounded by the corresponding protection zone 202, 204 need to be measured at exactly the same instant in time. This means the clocks at the various VPMUs 112, 144 or relays 102, 104 need to be synchronized. If the clocks are not synchronized, then the voltage phasors will be measured at different instants in time and the fault detection principle will not be satisfied. Hence the clocks at the various PMUs/relays need to be synchronized so that they perform the measurements 'in sync'. The GPS is an example of a satellite-based system that can be used as source of the synchronization clock. The measured phasors will have a time stamp on them such that the relay 102, 104 uses phasor values taken at the same instant in time. In this way the correct instantaneous power can be calculated.

In this example embodiment, the protection relay 102 provides protection to busbar 118 and the feeder 206 (which is located between busbar 116 and busbar 118). The protection relay 104 provides protection to busbar 116 and the same feeder 206 (which is located between busbar 116 and busbar 118). Simply put, this current protection zoning arrangement 200 and the voltage measurements over a particular protection zone enables the protection relay 104 to monitor the power flow across the protected zone 202 through power flow calculations, combined with sensitivity calculations over each protection zone 202, 204, the protection system 100 is thereby able to detect and identify the location of fault, in use. The protection system 100 is advantageous in that it is voltage-based and achieves its function through load flow and sensitivity calculations, requiring only the voltage magnitude and phase at each of the busbars 116, 118 in the relevant protected zone 202, 204.

Figure 3:
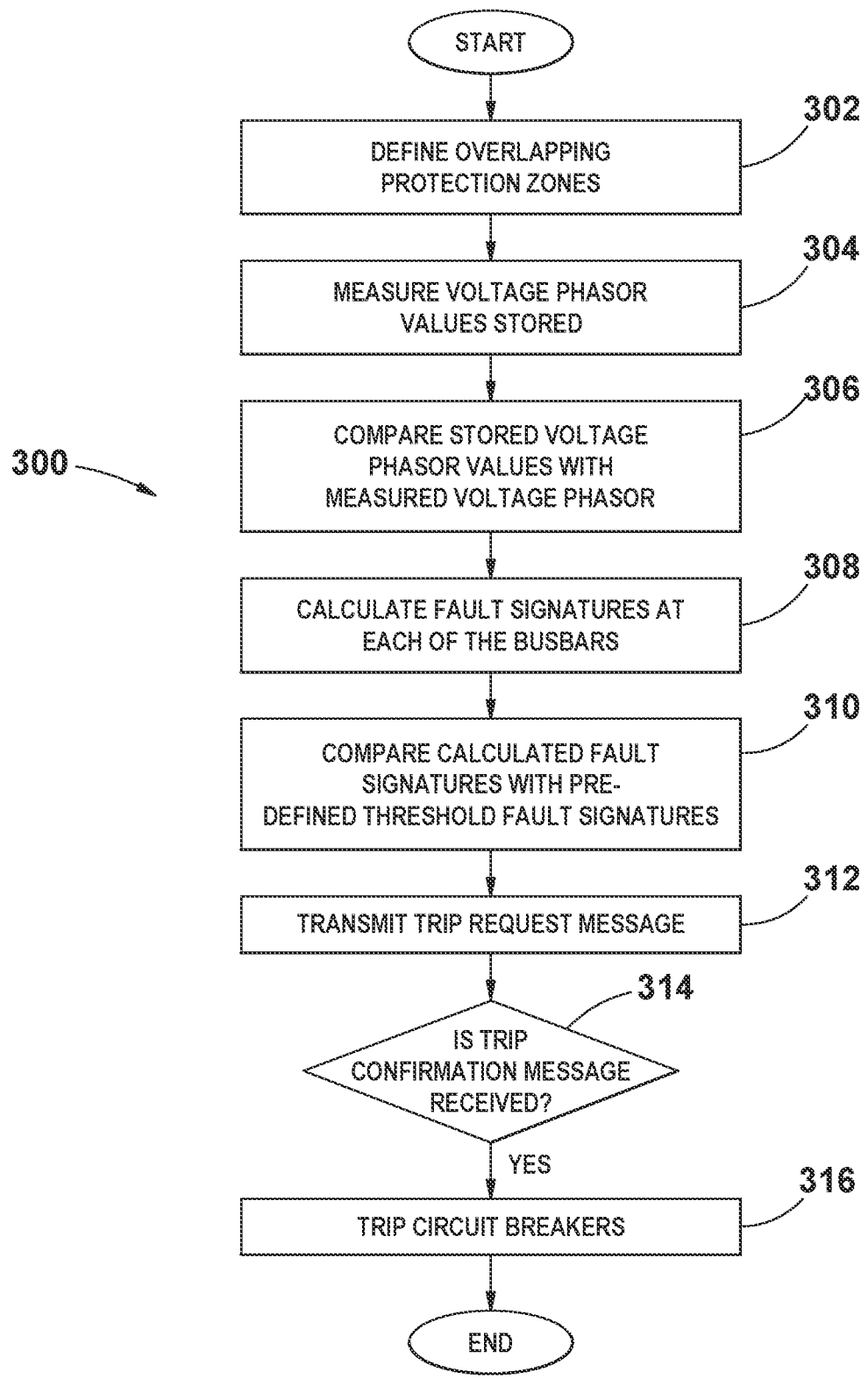
FIG. 3 shows a high-level method for detecting fault, in accordance with another aspect of the invention.
Figure 4:
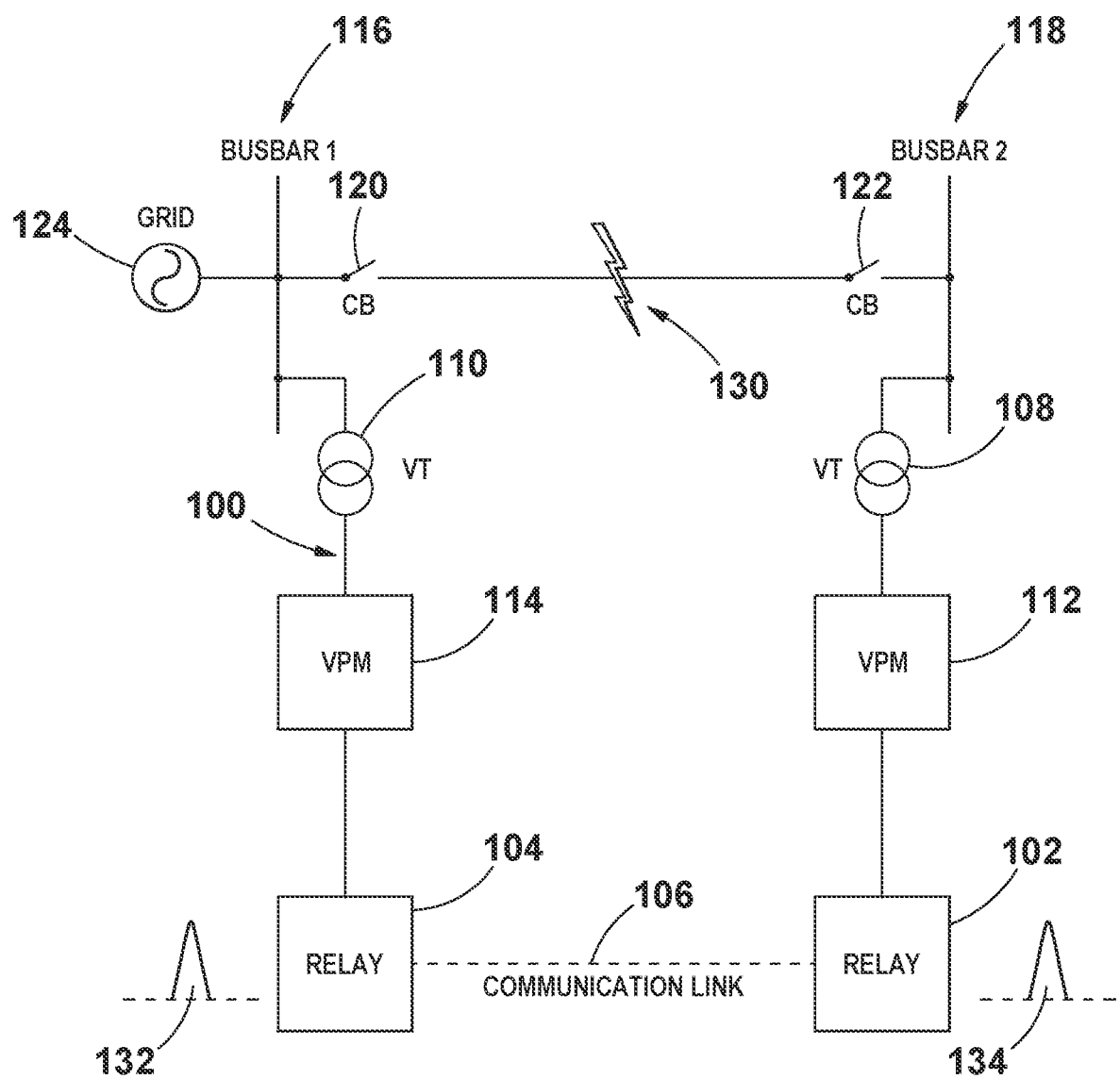
FIG. 4 shows an example embodiment of an electrical network with detected fault illustrated thereon.

The protection system 100, in particular, the modules and the components forming part of the protection system 100 will further be described in detail with reference to FIGS. 3 and 4. FIG. 3 illustrates a high-level method 300 for detecting fault. FIG. 4 illustrates an example embodiment of an electrical network with fault indicated thereon. The fault to be detected and identified can be a short circuit, alternatively, fault can be open-circuit. This is advantageous and a unique characteristic as most existing protection systems do not detect the open-circuit condition. The open circuit condition may result when one or more conductors of the distribution feeder break. The loss of supply can be due to broken conductors or some other cause. The protection system 100 is thus able to detect a broken conductor or the location of a line break, in use.

Figure 5:
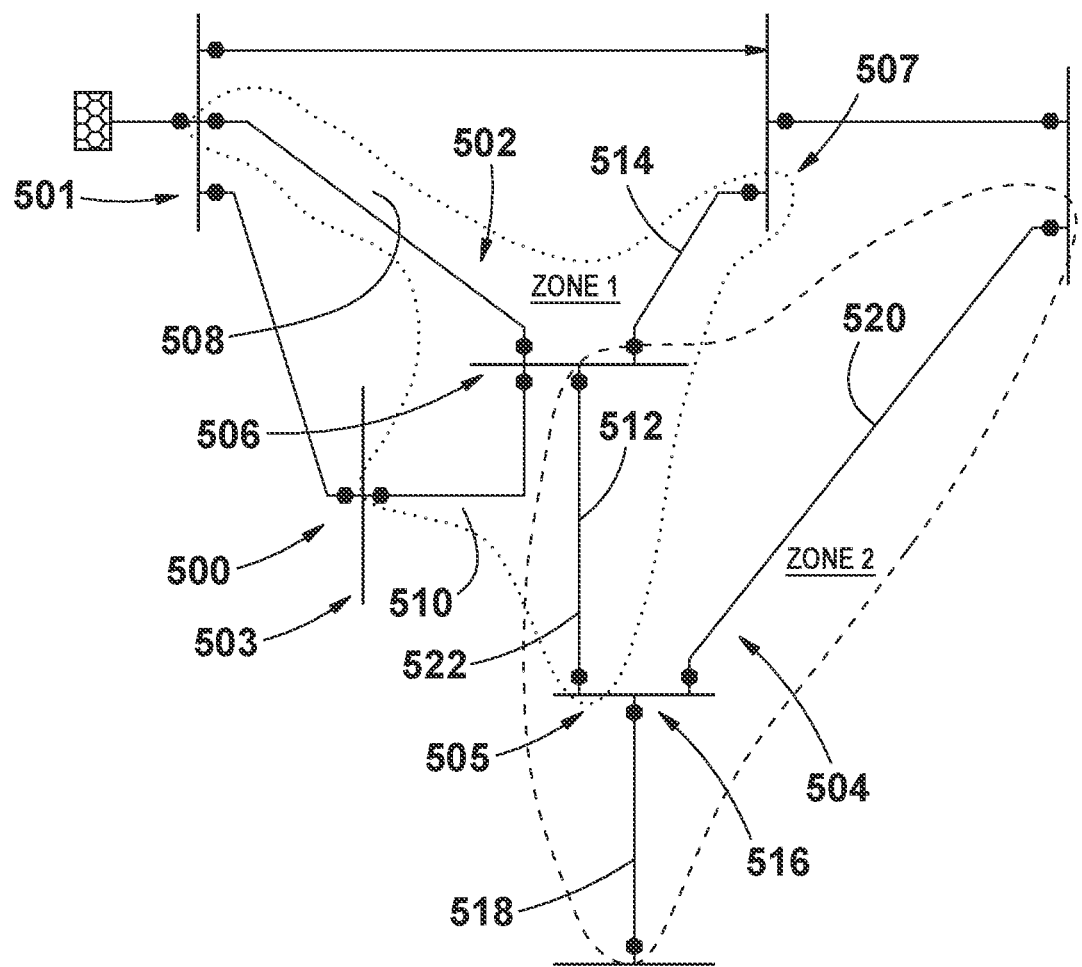
FIG. 5 shows an example embodiment of a network distribution system including the protection system of FIG. 1.

At block 302, the method 300 includes the step of defining protection zones 202, 204. Therefore, and as illustrated in FIGS. 1 and 2, the protection zones 202, 204 include at least two protection relays 102, 104, at least two busbars 116, 118 and at least one feeder 206 extending between the at least two busbars 116, 118. Referring now to FIG. 5, the protection system 100 can be extended to a networked distribution system 500, such as the one shown in FIG. 5. It is envisaged that the networked distribution system 500 can be provided with a plurality of protection zones, however, for the purpose of simplifying the description of the present invention, the networked distribution system 500 is split into two overlapping protection zones 502, 504. Each protection zone 502, 504 consists of at least one primary busbar and all the feeders terminating at that busbar. Protection zone 502 indicated as Zone 1 is centred at primary busbar 506 and consists of that busbar 506 and all the feeders 508, 510, 512 and 514 that terminate at that busbar 506. Protection zone 504 indicated as Zone 2 is centred at a second primary busbar 516 and consists of said busbar 516 and the feeders 518, 520 (which is the same as feeder 512 in Zone 1), and 522 that terminate at the said latter busbar 516. The overlapping of the protection zones 502, 504 is realized logically through protection relays (not shown) exchanging voltage measurements using peer-to-peer communications. An important feature of the protection system 100 is that only one protection relay is required at a busbar irrespective of the number of feeders terminating at the busbar, in use.

At block 304, the voltage phasor measurement devices 112, 114 measure voltage phasor values at their respective busbars 116, 118, as shown in FIG. 1. This is done in real-time, at all the busbars, in a particular protected zone. Each of the protection relays can include a storage module, e.g. a memory device, in which a reference quantity value such as a reference voltage magnitude and reference phase value are stored. At block 306, the stored reference quantity value (i.e. reference voltage magnitude and reference phasor value) such as a historical VPMU data output representing a pre-fault fault protection system, is compared to the measured voltage phase value. A calculation module (not shown) calculates (at block 308), fault signatures at each of the busbars within the relevant protected zone. The fault signatures are functions of the power flow change and the sensitivity coefficients at the particular busbar and the voltage magnitude and phase value changes at a number of busbars in the particular protected zone. At block 310, a comparison module (not shown) compares (see Flow Chart 1), in particular part "A" of Flow Chart 1, the calculated fault signatures with pre-defined threshold fault signatures.

The fault signatures, which are arbitrarily designated as CkP and CkF, are calculated using the equations indicated below:

$$CkP = -\frac{S_{V,P} \cdot \Delta P_k}{S_{V,Q}}$$

$$CkF = CkV \times CkP$$

where, $$CkV = \text{abs}\left|\frac{\Delta V_k - V_D}{S_{V,Q}}\right|$$

$$S_{V,P} = M^{-1}N^{-1}$$

$$S_{V,Q} = -M^{-1}T^{-1}$$

$$V_D = -(M^{-1}N^{-1}R - M^{-1}T^{-1}U)$$

$$\Delta P_k = \frac{\partial P_k}{\partial \delta_k}\Delta \delta_k + \sum_{\substack{j=1 \\ j \neq k}}^{n} \frac{\partial P_k}{\partial \delta_j}\Delta \delta_j + \frac{\partial P_k}{\partial V_k}\Delta V_k + \sum_{\substack{j=1 \\ j \neq k}}^{n} \frac{\partial P_k}{\partial V_j}\Delta V_j$$

$$\Delta V_k = M^{-1}\left[\left(N^{-1}(\Delta P_k - R)\right) - \left(T^{-1}(\Delta Q_k - U)\right)\right]$$

and, $$M = \left[\left(\frac{\partial P_k}{\partial \delta_k}\right)^{-1}\left(\frac{\partial P_k}{\partial V_k}\right) - \left(\frac{\partial Q_k}{\partial \delta_k}\right)^{-1}\left(\frac{\partial Q_k}{\partial V_k}\right)\right]$$

$$N = \frac{\partial P_k}{\partial \delta_k}$$

$$T = \frac{\partial Q_k}{\partial \delta_k}$$

-continued $$R = \left(\sum_{\substack{j=1 \\ j \neq k}}^{n} \frac{\partial P_k}{\partial \delta_j} \Delta \delta_j + \sum_{\substack{j=1 \\ j \neq k}}^{n} \frac{\partial P_k}{\partial V_j} \Delta V_j\right)$$

$$U = \left(\sum_{\substack{j=1 \\ j \neq k}}^{n} \frac{\partial Q_k}{\partial \delta_j} \Delta \delta_j + \sum_{\substack{j=1 \\ j \neq k}}^{n} \frac{\partial Q_k}{\partial V_j} \Delta V_j\right)$$

and, n=number of busbars in the protected zone,
k=node at which fault signatures are calculated.

If the fault path is inductive, the following alternative fault signatures are applicable:

$$C_{k,Q} = -\frac{S_{V,Q} \cdot \Delta Q_k}{S_{V,P}}$$

$$C_{k,F}^Q = C_{k,V}^Q \times C_{k,Q}$$

where, $$C_{k,V}^Q = \left|\frac{\Delta V_k - V_{D,k}}{S_{V,P}}\right|$$

$$\Delta Q_k = \frac{\partial Q_k}{\partial \delta_k} \Delta \delta_k + \sum_{\substack{j=1 \\ j \neq k}}^{n} \frac{\partial Q_k}{\partial \delta_j} \Delta \delta_j + \frac{\partial Q_k}{\partial V_k} \Delta V_k + \sum_{\substack{j=1 \\ j \neq k}}^{n} \frac{\partial Q_k}{\partial V_j} \Delta V_j$$

If the response is positive, i.e. the measured value is higher than the reference value, the relay located at the particular busbar, transmits (at block 312) a trip request message to a neighbouring/remote relay. If the former relay receives a confirmation message from the latter neighbouring relay, at block 314, then the circuit breaker on the feeder associated with the busbar the latter neighbouring protection relay will trip (at block 316). If the former relay does not receive a confirmation message from the neighbouring protection relay, it will cause all circuit breakers at the busbar associated therewith to break after a time delay during which the former relay expects to receive the confirmation signal from the latter neighbouring relay. By way of example, referring to FIG. 5, at busbar 506, there are four feeders 508, 510, 512, and 514 terminating at primary busbar 506. In use, when the response is positive, the relay (not shown) at busbar 506 sends a request to trip signal to its neighbouring relays (not shown) at busbars 501, 503, 505, and 507. If one of these neighboring relays also sees a fault at its corresponding busbars, it sends a permission to trip signal to the relay at busbar 506, while at the same time breaking the circuit breaker associated with its dedicated busbar. Therefore, only the circuit breaker on the feeder linking busbar 506 to the neighbouring relay (not shown) which responded will be tripped. The relay at busbar 506 will consequent trip the local CB on the feeder linking the busbar 506 with the neighbouring relay (not shown) that responded to the request to trip the circuit breaker. The other circuit breakers associated with the relays which did not send the confirming message will not be tripped. That is, the protection is selective when confirmation is received.

However, if none of the neighbouring relays responds with permission to trip, the relay at busbar 506 will trip all the local circuit breakers on all the outgoing feeders 508, 510, 512, 514 terminating at the busbar 506. One of the reasons for not receiving confirmation could be communication failure between the relays, or the other relay may simply not see the fault. In this particular scenario, the protection is not selective when no confirmation is received.

Now if the power network has only one feeder, such as that shown in FIGS. 1 and 2, whether or not the relay 104 receives a permission to trip signal, it will still trip its local circuit breaker 120. However, there is an important difference:
if the said relay 104 receives the confirmation to trip, it will trip the circuit breaker 120 immediately; and
if no confirmation message is received from the neighbouring relay 102, the former relay 104 will wait for a time delay during which it expects to receive the confirmation message/signal from the neighbouring relay 102, whereby if it does not receive the message, it will proceed to trip the circuit breaker 120 on expiry/lapse of this time delay.

It will be appreciated that the protection relay trips if the magnitude of the fault signature is above a pre-defined threshold signature. The threshold is established by the magnitude of electrical (fault) signatures generated when the maximum load at a busbar is connected. Therefore, through peer-to-peer communications over the communication link 106 and an output logic of the protection system 100, the fault is located and the respective circuit breakers (CBs) at the two ends of the feeder are tripped (opened). The fault is then isolated.

Figure 6:
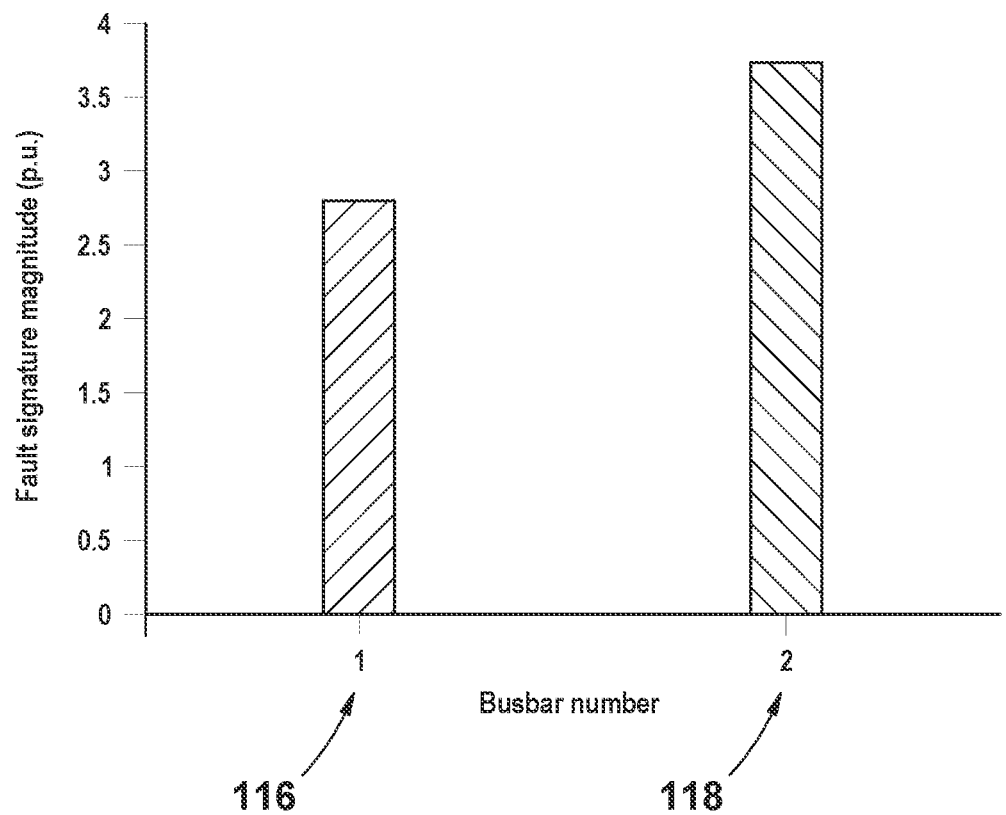
FIG. 6 shows an example of fault signature generated at busbars forming part of the protection system of FIG. 1.

Referring to FIG. 4, the protection is voltage-based and achieves its function through load flow and sensitivity calculations, requiring only the measurement of voltage magnitude and phase at each of the nodes or busbars in the protected zone. Each relay at a busbar monitors power flows across its respective protection zone through load flow calculations. Sensitivity-based electrical fault signatures are generated when a fault occurs within this protection zone. When the power flowing into the zone equals the power flowing out, no signature is generated. Only when there is a 'leakage' or fault within this segment, causing power flow imbalance, is a signature generated and fault detected. FIG. 4 illustrates a detected fault indicated with reference numeral 130. Signals 132, 134 are graphical representations of the fault signatures (calculated by the relays at block 308 in FIG. 3). The fault signatures can be expressed simply as numerical output, but in use, a graphical representation is easier to read to assist in identifying a fault more quickly. FIG. 6 further illustrates fault signatures generated at busbar 116 and busbar 118, respectively. Fault signature indicated at busbar 116 has a magnitude of about 2.7 p.u, while fault signature indicated at busbar 118 has a magnitude of about 3.8 p.u.

Figure 7:
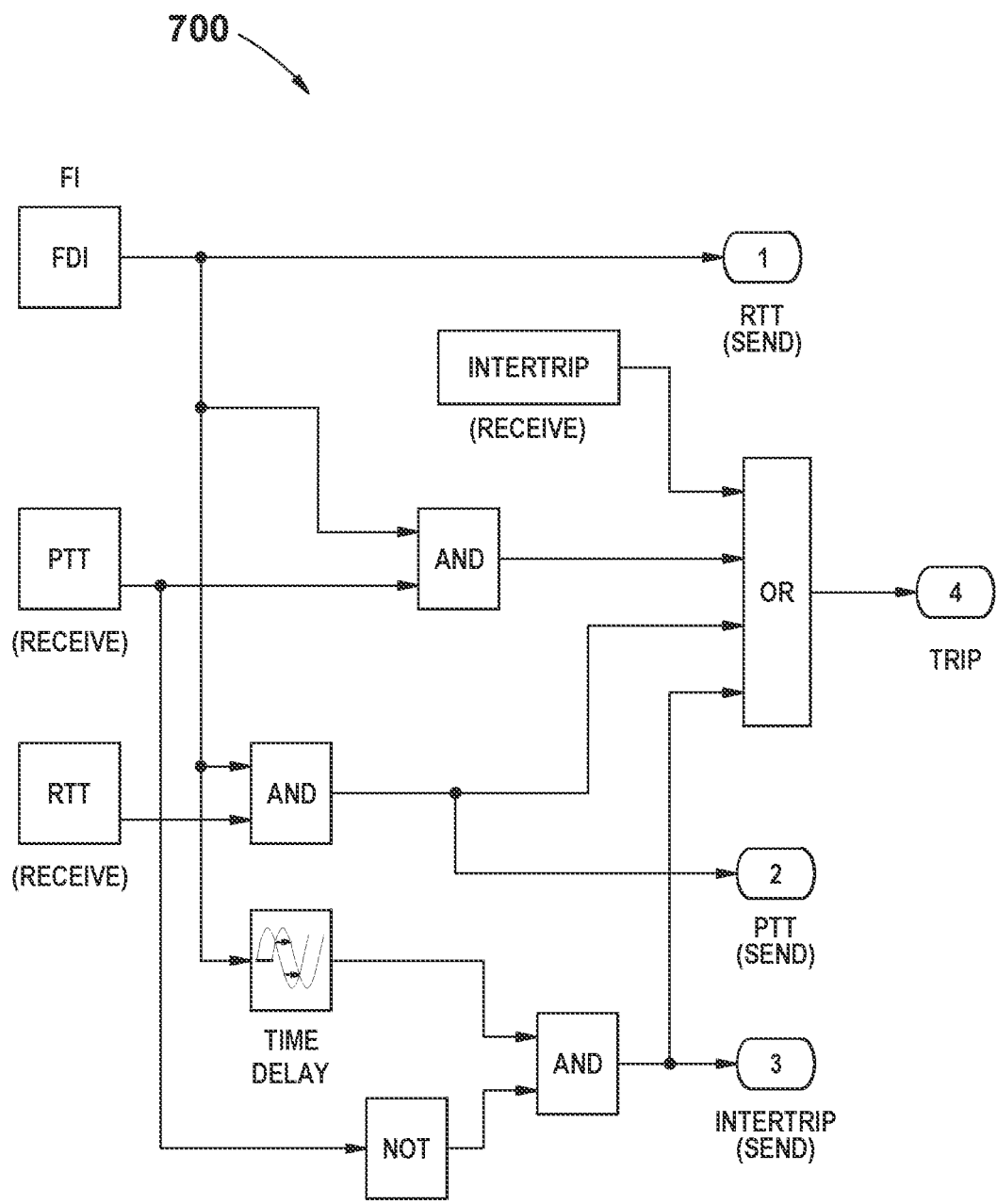
FIG. 7 shows a control loop system between relays of the protection system of FIG. 1.
Figure 8:
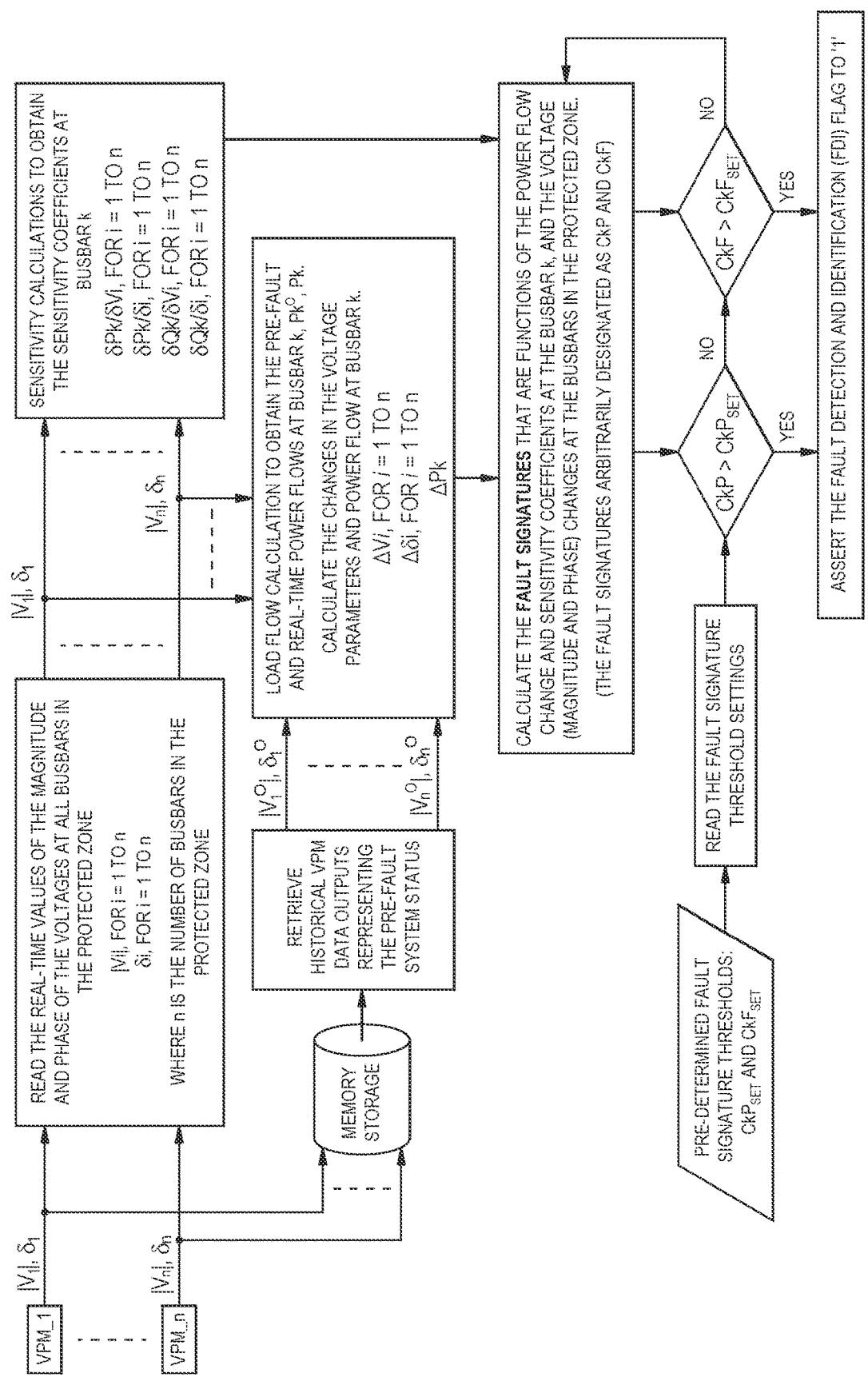
FIG. 8 shows a method for detecting and isolating fault in a power system in accordance with another aspect of the invention.

In simple terms, in use, and referring both to FIG. 7, which illustrates an example embodiment of a logic for the identification and isolation of the fault (indicted with reference numeral 700) and FIG. 8, when a fault is detected by a primary relay (not shown) at a busbar (i.e., FDI=1, from Flow Chart 1), the primary relay sends a request to trip (RTT) signal to the relays at the remote ends of all the feeders terminating at that busbar. If one of the remote relays (RR) has also detected a fault it sends a permission to trip (PTT) signal back to the primary relay (PR) that sent the RTT, at the same time tripping its local circuit breaker (CB) on the feeder linking to the PR. On receipt of the PTT signal the PR also trips its local CB on the feeder linking to the RR. If no PTT is received from any of the RRs at the remote ends of the other connected feeders, then all local circuit breakers at those feeders terminating at the busbar associated with the PR will be tripped.

Where none of the RRs has detected a fault, which is the case when the fault is on the PR busbar itself, then on expiry of a time delay (during which the PR expects to receive a PTT from one of the RRs), the PR trips all the local CBs of the feeders terminating at the PR busbar, and sends inter-trip signals to the RRs. Since none of the RRs has seen a fault, the inter-trip signal is not supervised. In this case, all the feeders terminating at the PR are tripped. A fault on the busbar normally requires tripping of the local CBs only. But a fault on the feeder side of the local CBs may be seen as though it is on the PR busbar itself, depending on the reach of the RRs. To be able to isolate and clear such fault, the remote CBs should be tripped as well so as to be able to de-ionise the fault path and ensure successful re-close operation.

If a fault occurs but the communication link has failed between the PR and one of the RRs, then the RTT or PTT signals cannot be sent or received to/from the concerned RR. Since none of the remaining RRs has detected a fault, then on expiry of the time delay, the PR trips all the local CBs and sends inter-trip signals to those RRs with which it has active communication links. All the feeders terminating at the PR are tripped. The CB at the remote end of the faulted feeder, however, is still closed as far as the PR is concerned. Now, the remote RR is also a PR as far as its location is concerned. So its action replicates that of the other PR at the remote end. On expiry of the time delay, the 'remote' PR will trip all the 'local' CBs and sends inter-trip signals to those RRs with which it has active communication links. Those feeders terminating at the 'remote' PR are also tripped. Hence, the total sum of all feeders terminating at the two 'PRs' are tripped.

The Inventors believe that the invention as exemplified is advantageous in that it provides a method 300 and system 100 for detecting and isolating fault efficiently while using voltage measurements only.

The invention claimed is:

1. An electrical protection system which is arranged to detect and isolate faults either selectively or non-selectively in a power system/electrical power distribution comprising at least
   a first busbar, and
   a second busbar in electrical communication with each other by means of at least
   one powerline having a first end that is electrically coupled to the first busbar by
   a first circuit breaker and a second end that is connected to the second busbar by
   a second circuit breaker, the electrical protection system being connected to the at least two busbars, and configured to simultaneously collect/determine a first electrical quantity value at each of the at least two busbars and compare the collected/determined the first electrical quantity value to a second reference electrical quantity value and wherein when the first electrical quantity value is more or less than the second reference electrical quantity value, the electrical protection system causes at least one of the first and second circuit breakers to open so as to decouple the electrical connection between at least the first and second busbars,
   a communication network,
   at least a first relay and a second relay which are communicatively coupled to each other through the communication network, the first relay being connected to at least one of the first busbar and at least one powerline so as to define a protection zone over the first busbar, first circuit breaker and at least one powerline, wherein the second relay being connected to at least one of the second busbar and at least one powerline so as to define a second protection zone over the second busbar, second circuit breaker and at least one powerline,
   a first electrical quantity value measuring means coupled to the first relay for measuring a first electrical quantity value at one of the first busbar and at least one powerline,
   a second electrical quantity value measuring means coupled to the second relay for measuring a first electrical quantity value at one of the second busbar and at least one powerline, at the same time as the first electrical quantity value measuring means measures the first electrical quantity value at the first busbar,
   a comparison module being operable to compare the first electrical quantity value collected/measured by each of the first electrical quantity value measuring means and second electrical quantity value means to a second reference electrical quantity value at the dedicated busbar,
   a calculation module for calculating fault signature values at the first busbar and second busbar when the first electrical quantity value is different from the second electrical quantity value, wherein
   the comparison module further being operable to determine whether or not the calculated fault signature values match with pre-defined threshold fault signatures, wherein
   when the calculated signature values collected by the first relay are more or less than the predefined threshold fault signature, the first relay transmits a trip request signal/message to the second relay, and wherein
   upon receiving the trip request signal, the second relay confirms whether or not the calculated signature values at the second busbar are more or less than the predefined threshold signature value at the second busbar, and accordingly transmits a confirmation or deny signal to the first relay to either open the first circuit breaker or keep the first circuit breaker closed.

2. The electrical protection system according to claim 1, wherein when a confirmation or deny trip request signal is not received after a lapse of a predefined period, the first relay automatically opens the first circuit breaker at the at least one power line.

3. The electrical protection system according to claim 1, wherein when the second relay transmits a confirmation message to the first relay, the second relay opens the second circuit breaker communicating the powerline with the first busbar.

4. The electrical protection system according to claim 3, wherein the first protection zone and second protection zone overlap.

5. The electrical protection system according to claim 1, wherein the first electrical quantity value includes voltage phasor values.

6. The electrical protection system according to claim 5, wherein the voltage phasor values include voltage magnitude and phase values.

7. The electrical protection system according to claim 1, wherein the system comprises a plurality of busbars and a network of powerlines terminating one of the busbars.

8. The electrical protection system according to claim 1, wherein the measuring means is in a form of phasor measurement device.

9. The electrical protection system according to claim 8, wherein the phasor measurement device is a voltage phasor measurement device.

10. The electrical protection system according to claim 9, wherein the voltage phasor measurement device is an integral part of the relay.

11. The electrical protection system according to claim 9, wherein the voltage phasor measurement device is a separate device connectively coupled to the relay.

12. An electrical system comprising
a power system for connecting to an electrical grid or power source, the power system comprising at least
a first busbar, and
a second busbar in electrical communication with each other by means of at least
one power line having a first end that is electrically coupled to the first busbar by
a first circuit breaker and a second end that is electrically connected to the second
busbar by
a second circuit breaker; and
an electrical protection system which is arranged to detect and isolate faults either selectively or non-selectively in the power system, the electrical protection system being connected to the at least two busbars, and configured to simultaneously collect/determine a first electrical quantity value at each of the at least two busbars and compare the collected/determined the first electrical quantity value to a second reference electrical quantity value, wherein
when the first electrical quantity value is more or less than the second reference electrical quantity value, the electrical protection system causes at least one of the first and second circuit breakers to open so as to decouple the electrical connection between at least the first and second busbars,
a communication network, at least
a first relay and
a second relay which are communicatively coupled to each other through the communication network, the first relay being connected to at least one of the first busbar and the at least one powerline so as to define a protection zone over the first busbar, first circuit breaker and the at least one powerline, wherein
the second relay being connected to at least one of the second busbar and at least one powerline so as to define a second protection zone over the second busbar, second circuit breaker and the at least one powerline,
a first electrical quantity value measuring means coupled to the first relay for measuring a first electrical quantity value at one of the first busbar and the at least one powerline,
a second electrical quantity value measuring means coupled to the second relay for measuring a first electrical quantity value at one of the second busbar and the at least one powerline, at the same time as the first electrical quantity value measuring means measures the first electrical quantity value at one of the first busbar and at least one feeder,
a comparison module being operable to compare the first electrical quantity value that is simultaneously collected/measured by each of the first electrical quantity value measuring means and second electrical quantity value means, to a second reference electrical quantity value at the dedicated busbar,
a calculation module for calculating fault signature values at the first busbar and second busbar when the first electrical quantity value is different from the second electrical quantity value, wherein
the comparison module further being operable to determine whether or not the calculated fault signature values match with pre-defined threshold fault signatures, wherein
when the calculated signature values collected by the first relay are more or less than the predefined threshold fault signature, the first relay transmits a trip request signal/message to the second relay, and upon receiving the trip request signal, the second relay confirms whether or not the calculated signature values at the second busbar are more or less than the predefined threshold signature value at the second busbar, and accordingly transmits a confirmation or deny signal to the first relay to either open the first circuit breaker or keep the first circuit breaker closed.

13. The electric protection system according to claim 1, wherein the system comprises at the voltage transformer at least two voltage transformers being operable to step down primary voltage suitable levels that is fed to an electronic device in use.

14. The electrical protection system according to claim 1, wherein the calculation module calculates the fault signatures using load flow and sensitivity calculations at the busbars.

15. The electrical protection system according to claim 1, wherein the pre-defined threshold is established by magnitude of fault signatures generated when a maximum load at the busbar, and wherein
each of the at least two first and second relays includes a storage module, whereby reference voltage magnitude and phase values are stored thereon.

16. The electrical protection system according to claim 15, wherein the storage module is updated, on a regular basis with the historic values of the voltage magnitude and phase representing pre-fault status of the power system on at least the first and second busbars.

17. The electrical protection system according to claim 1, wherein the fault is short-circuit faults.

18. The electrical protection system according to claim 1, wherein the fault is an open-circuit fault.

19. The electrical system according to claim 12, wherein the faults are open-circuit faults.

20. The electrical system according to claim 12, wherein when a confirmation or deny trip request signal is not received after a lapse of a predefined period, the first relay automatically opens the first circuit breaker at the at least one powerline.

21. The electrical system according to claim 20, wherein when the second relay transmits a confirmation message to the first relay, the second relay opens the second circuit breaker communicating the powerline with the first busbar.

22. The electrical system according to claim 21, wherein the first protection zone and second protection zone overlap.

23. The electrical system according to claim 12, wherein the first electrical quantity value includes voltage phasor values.

24. The electrical system according to claim 23, wherein the voltage phasor values include voltage magnitude and phase values.

25. The electrical system according to claim 12, wherein the system comprises a plurality of busbars and a network of powerlines terminating one of the busbars.

26. The electrical system according to claim 12, wherein the measuring means is in a form of phasor measurement device.

27. The electrical system according to claim 12, wherein the electrical protection system includes at least two voltage transformers being operable to step down primary voltage suitable levels that is fed to an electronic device, in use.

28. The electrical system according to claim 12, wherein the calculation module calculates the fault signatures using load flow and sensitivity calculations at the busbars.

29. The electrical system according to claim 28, wherein the pre-defined threshold is established by magnitude of fault signatures generated when a maximum load at the busbar is connected in use.

30. The electrical system according to claim 12, wherein each of the at least two first and second relays includes a storage module, and wherein reference voltage magnitude and phase values are stored thereon.

31. The electrical system according to claim 12, wherein the faults are short-circuit faults.

32. A method for detecting and isolating fault in a power system comprising at least a first busbar and a second busbar in electrical communication with each other by means of at least one power line having a first end that is electrically coupled to the first busbar by a first circuit breaker and a second end that is connected to the second busbar by a second circuit breaker, the method includes the steps of:
- connecting a protection system to the at least two first and second busbars;
- simultaneously collecting/determining, by the protection system, a first electrical quantity value at each of the at least two first and second busbars;
- comparing, by the protection system, the collected/determined first electrical quantity value to a second reference electrical quantity value, and wherein when the first electrical quantity value is more or less than the second reference electrical quantity value, the protection system causing at least one of the first and second circuit breakers to open so as to decouple the electrical connection between at least the first and second busbars.

* * * * *